3,062,689
METHOD OF CLEANING SURFACES OF RESINOUS BODIES
Masao Nakamura, Midland, Mich., assignor to The Dow Chemical Company, Midland, Mich., a corporation of Delaware
No Drawing. Filed Oct. 26, 1961, Ser. No. 147,736
6 Claims. (Cl. 134—6)

This invention relates to a method of cleaning surfaces of thermoplastic resinous bodies. More particularly, it relates to a method of cleaning surfaces of bodies of alkenyl aromatic resins. Specifically, it relates to the method of cleaning surfaces of such resinous bodies when the said bodies are in a condition of either compressive or elastic stress.

By an "alkenyl aromatic resin" is meant a solid polymer of one or more polymerizable alkenyl aromatic compounds. Such polymer comprises in chemically combined form at least 50 percent by weight of at least one alkenyl aromatic compound having the general formula:

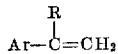

wherein Ar represents an aromatic hydrocarbon radical, or an aromatic halohydrocabon radical, of the benzene series, and R is hydrogen or the methyl radical. Examples of such alkenyl aromatic resins are the solid homopolymers of styrene, alpha-methyl styrene, vinyltoluene, ar-ethylstyrene, vinylxylene, ar-chlorostyrene, ar-isopropyl styrene or ar-tertiarybutyl styrene; the solid copolymers of two or more of such alkenyl aromatic compounds with one another; and solid copolymers of one or more of such alkenyl aromatic compounds with minor amounts of other readily polymerizable olefinic compounds such as methyl methacrylate or acrylonitrile.

Resins of the above type find wide use in a variety of structural and decorative applications. They are readily fabricated by a variety of techniques and products manufactured therefrom display excellent resistance to discoloration on aging, are relatively inert to the effects of moisture and possess an attractive, easily cleaned, smooth, glossy surface.

Because of the above listed characteristics, alkenyl aromatic resins, as exemplified by polystyrene, find useful application, for example, in the manufacture of inner door panels or liners for household or commercial refrigerators. In this application, they offer significant economy over enameled steel, together with ease of handling and installation.

One major difficulty, however, attends the manufacture of refrigerators having door liners of the type indicated. Inevitably, during the process of assembly of the refrigerator, grease spots or other discolorations appear on the surfaces of refrigerator, including that of the plastic door liner. It is common practice for the worker on the assembly line to remove these spots by wiping the surface with a solvent such as Stoddard solvent or isopropanol. These materials, while excellent for cleaning the enamel surface of the refrigerator, may not safely be employed on the resinous liner surface.

In the manufacture of refrigerator door liners the technique of vacuum forming is ordinarily employed. As is known, the use of this technique gives rise to resinous bodies having zones or areas that are in a highly stressed condition. The application of a material of even moderate solvent power for the resin to stressed portions of the door liner results in almost immediate crazing of the surface. This may be severe enough to cause splitting of the liner beneath the crazed area. In any event, the appearance of the surface is so altered that replacement of the liner is invariably necessary.

In addition, many solvents effective for the cleaning of the enamel surface have a sufficient solvent power for the resinous material comprising the door liner that their use thereon will destroy the gloss of the liner surface. Thus, even if such solvents do not contact a stressed area, their use may render the liner unfit for consumer acceptance.

It is therefore an object of the invention to provide a method of cleaning surfaces of resinous bodies of the class described without impairing the appearance of said surfaces. It is an additional and more important object to provide a method of cleaning surfaces that bound zones of the resinous body in which stresses exist.

It has been found that dirt, tar, grease and the like may readily be removed from the surface of bodies of alkenyl aromatic resins by the application thereto of a solution of white mineral oil in a dichlorotetrafluoroethane such as 1,2-dichlorotetrafluoroethane, 1,1-dichlorotetrafluoroethane or mixtures thereof, followed by wiping with a cloth, sponge or the like. Specifically, it has been determined that the described cleaning material may be applied to highly stressed resinous material without danger of inducing stress-cracking or crazing. Additionally, the glossy surface of the resin is unaffected by the cleaning material.

In practice, because of the volatility of the chlorofluoroethane solvents, the cleaning material of the present invention are advantageously applied from a pressurized spray can. In general, the mineral oil will constitute from about 2.0 to about 20.0 percent by volume of the solution, with from about 5.0 to about 10.0 percent by volume representing the preferred range of composition.

In a typical example of the present cleaning method, a heavy lubricating grease was smeared over a vacuum-formed polystyrene refrigerator door liner along a line at which the resinous material was under high stretching stress. From a pressurized spray can held about 6" from the surface there was directed on and around the grease smear a spray of a 10 percent by volume solution of mineral oil in 1,2-dichlorotetrafluoroethane. The duration of the spraying was about 3 seconds. After a few seconds the spot was completely removed by wiping with a soft cloth. The glossy surface of the door liner was unharmed.

In contrast, when a cloth dampened with Stoddard solvent was employed to remove a completely comparable stain, deep crazing evidenced itself immediately along the line of concentrated stress.

What is claimed is:

1. A method of cleaning the surface of a body of a polymeric composition comprising in chemically combined form at least 50 percent by weight of at least one alkenyl aromatic compound having the general formula

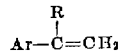

wherein Ar represents an aromatic radical of the group consisting of hydrocarbon and halohydrocarbon radicals of the benzene series and R represents a member of the group consisting of hydrogen and the methyl radical, said method comprising applying to said surface a cleaning solution containing from about 2 to about 20 percent by volume of white mineral oil in a dichlorotetrafluoroethane solvent and thereafter removing the deposited solution with an adsorbent body.

2. The method of claim 1 wherein the cleaning solution contains from about 5 to about 10 percent by volume of white mineral oil.

3. A method of cleaning the surface of a body of a polymeric composition comprising in chemically combined form at least 50 percent by weight of at least one alkenyl aromatic compound having the general formula

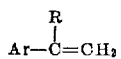

wherein Ar represents an aromatic radical of the group consisting of hydrocarbon and halohydrocarbon radicals of the benzene series and R represents a member of the group consisting of hydrogen and the methyl radical, said method comprising applying to said surfaces a cleaning solution containing from about 5 to about 10 percent by volume of white mineral oil in a solvent which is a member of the group consisting of 1,2-dichlorotetrafluoroethane, 1,1-dichlorotetrafluoroethane and mixtures thereof and thereafter removing the deposited solution with an adsorbent body.

4. The method according to claim 3 wherein the solvent is 1,2-dichlorotetrafluoroethane.

5. The method according to claim 3 wherein the solvent is 1,1-dichlorotetrafluoroethane.

6. The method according to claim 3 wherein the solvent is a mixture of 1,1-dichlorotetrafluoroethane and 1,2-dichlorotetrafluoroethane.

References Cited in the file of this patent

UNITED STATES PATENTS 2,995,521      Estiguard-Bluard      Aug. 8, 1961